(12) United States Patent
Gagne

(10) Patent No.: US 7,162,857 B1
(45) Date of Patent: Jan. 16, 2007

(54) SCRAPING ADAPTOR

(76) Inventor: Denis Gagne, 6382, rue Matte, Montreal-Nord, Que (CA) H1G 2E8

( * ) Notice: Subject to any disclaimer, the term of this patent is extended or adjusted under 35 U.S.C. 154(b) by 0 days.

(21) Appl. No.: 10/994,347

(22) Filed: Nov. 23, 2004

(51) Int. Cl.
*A01D 7/10* (2006.01)
(52) U.S. Cl. .................................................. 56/400.07
(58) Field of Classification Search ............ 56/400.05, 56/400.06, 400.07, 400.04
See application file for complete search history.

(56) References Cited

U.S. PATENT DOCUMENTS

| | | | | |
|---|---|---|---|---|
| 415,599 A | * | 11/1889 | Woodworth | 56/400.06 |
| 571,371 A | * | 11/1896 | Huntington | 56/400.05 |
| 937,219 A | * | 10/1909 | Morrill | 56/400.06 |
| 1,050,685 A | * | 1/1913 | Peacock | 56/400.06 |
| 1,151,584 A | * | 8/1915 | Hartman | 56/400.06 |
| 1,800,103 A | * | 4/1931 | Pihl | 56/400.06 |
| 1,878,553 A | * | 9/1932 | Todd | 56/400.06 |
| 2,010,325 A | * | 8/1935 | Sawyer | 56/400.05 |
| 2,194,716 A | * | 3/1940 | Neuhausen | 403/4 |
| 2,317,916 A | * | 4/1943 | Kallal | 56/400.01 |
| 5,809,760 A | * | 9/1998 | Rexroat | 56/400.05 |

* cited by examiner

*Primary Examiner*—Meredith C. Petravick

(57) ABSTRACT

A scraping adapted for attachment to the raking head of a conventional rake includes a substantially elongated adapter body defining a body first longitudinal edge, an opposed body second longitudinal edge and a pair of substantially opposed body longitudinal ends. The adapter body is configured so as to provide a substantially longitudinally extending scraping section adjacent the body first longitudinal edge. The scraping adapter also includes a body-to-head attachment structure for attaching the adapter body to the raking head with the head base and body longitudinal axis in a parallel relationship relative to each other and the scraping section positioned opposite the rake tines.

17 Claims, 3 Drawing Sheets

SCRAPING ADAPTOR

FIELD OF THE INVENTION

The present invention relates to the general field of gardening implements and is particularly concerned with a scraping blade attachment for rakes.

BACKGROUND OF THE INVENTION

Conventional rakes commonly referred to as "garden" rakes are well known. They typically include a pole or elongated handle having a crossbar toothed like a comb at a distal end thereof. Rakes are commonly used for drawing together cut grass, hay or the like. They are also often used for smoothing loose soil or gravel.

Although conventional rakes typically perform their intended purpose adequately, they suffer from at least one main drawback. Indeed, most conventional rakes are typically inherently limited in their range of usage by the very nature of their toothed configuration.

The toothed configuration of the cross-bar is typically defined by a set of tines extending therefrom. The tines being spaced apart from each other, conventional rakes are not particularly well adapted for use as scrapers or as implements for moving or leveling loose material, viscous material or the like such as earth, mud, sand, gravel, cement or the like.

Although other types of hand manipulated implements are specifically designed for scraping or moving such loose or viscous material, these other types of manual implements typically include a scraping blade that has proven unsatisfactory for performing raking functions commonly associated with rakes such as drawing together grass or hay-like material. Accordingly, it would be desirable to provide an attachment allowing for conversion of a rake-type implement into an implement allowing for both raking and scraping functions.

SUMMARY OF THE INVENTION

It is an object of the present invention to provide a scraping attachment attachable to a rake for allowing the latter to be used both for raking and scraping functions.

In accordance with the present invention, there is provided a scraping adapter for attachment to the raking head of a rake, the raking head extending from a substantially elongated rake handle, the raking head including a generally elongated head base defining a head base longitudinal axis, a head base first longitudinal edge and a substantially opposed head base second longitudinal edge, the head base also defining a head first side facing substantially towards the rake handle and an opposed head second side; the raking head also including a plurality of rake tines extending outwardly from the head base first longitudinal edge in a substantially parallel and spaced relationship relative to each other, the scraping adapter comprising: a substantially elongated adapter body defining a body longitudinal axis, a body first longitudinal edge, a substantially opposed body second longitudinal edge and a pair of substantially opposed body longitudinal ends; the adapter body being configured so as to provide a substantially longitudinally extending scraping section substantially adjacent the body first longitudinal edge; a body-to-head attachment structure for attaching the adapter body to the raking head with the head base and body longitudinal axes in a substantially parallel relationship relative to each other and the scraping section positioned substantially opposite the rake tines. Conveniently, the scraping section extends inwardly from the body first longitudinal edge between the body longitudinal ends.

Typically, the adapter body defines a body first main surface and a substantially opposed body second main surface, the body first main surface being configured and sized so that at least part of the head second surface is positionable against the body first main surface; the body-to-head attachment structure including an attachment plate, the attachment plate being configured and sized so as to be releasably positionable in at attachment configuration over at least a portion of the head first side; a biasing structure for biasing the attachment plate against the head first side when the head second side contacts the body first main surface so as to squeeze the raking head between the adapter body and the attachment plate.

Conveniently, the biasing structure includes at least one body attachment aperture extending through the adapter body; at least one plate attachment aperture extending through the attachment plate; the body and plate attachment apertures being configured, sized and positioned so as to be substantially in register when the attachment plate is in the attachment configuration; at least one attachment assembly for extending through the attachment component and plate apertures and biasing the attachment plate against the head first surface.

Typically, the attachment plate has a substantially elongated configuration defining a first plate longitudinal edge and a substantially transversely opposed plate second longitudinal edge; the plate first longitudinal edge being provided with a plate recess formed therein; the plate recess is adapted to receive part of the rake handle when the attachment plate is in the attachment configuration.

Conveniently, the body first main surface is provided with an abutment protrusion protruding substantially outwardly therefrom; the abutment protrusion defining an abutment surface configured, sized and positioned for abuttingly supporting the head base second longitudinal edge.

In at least one embodiment of the invention, the scraping adaptor further comprises auxiliary tines extending from the scraping adapter substantially opposite the scraping section; the auxiliary tines being positioned substantially lateral relative to the rake tines on at least one side of the rake head when the scraping adapter is attached to the rake head.

In at least one embodiment of the invention, the scraping adaptor further comprises at least one auxiliary plate, the auxiliary tines extending from the at least one auxiliary plate, the at least one auxiliary plate being releasably attachable to the adapter body so as to be positioned substantially laterally relative to the raking head when the raking head is attached to the scraping adapter.

Advantages of the present invention include that the proposed attachment allows a conventional rake to be converted into an implement that can be used for clearing surfaces, such as pavements, driveways and the like and/or leveling surfaces of material such as freshly poured cement, loose soil or the like.

The proposed attachment is designed so as to be attachable to conventional rakes through a set of quick and ergonomic steps with requiring special tooling or manual dexterity. Also, the proposed device is designed so as to be attachable to a conventional rake with reduced risks of damaging the rake or the attachment itself.

Furthermore, the proposed attachment, when combined with a rake or the like, results in a lightweight implement allowing for reduction in the efforts required in the performance of operations of the implement over prior art implements.

Still further, the proposed implement is designed so as to be relatively uncomplicated in construction, manufacturable through conventional forms of manufacturing, so as to produce an attachment device that will economically feasible, long lasting and relatively trouble free in operation.

Also, the proposed attachment is designed so as to be relatively compact so as to facilitate storage and shipping thereof.

Furthermore, the proposed attachment is designed so as to be attachable to a conventional rake in such a manner that when combined with the rake it allows both for conventional raking features and added scraping features. The raking and scraping features being alternatively available by a mere rotation of the conventional rake handle about its longitudinal axis. Still further, the proposed attachment is designed so as to improve the raking capabilities of the conventional rake when combined with the latter in the manner hereinafter set forth.

Still furthermore, the proposed scraping blade attachment is designed so as to be easily retro-fittable to conventional rakes and is also designed so as to be easily manufacturable as an attachment sold with new rakes.

BRIEF DESCRIPTION OF THE DRAWINGS

Embodiments of the present invention will now be disclosed, by way of example, in reference to the following drawings, in which.

DETAILED DESCRIPTION

Figure 2:
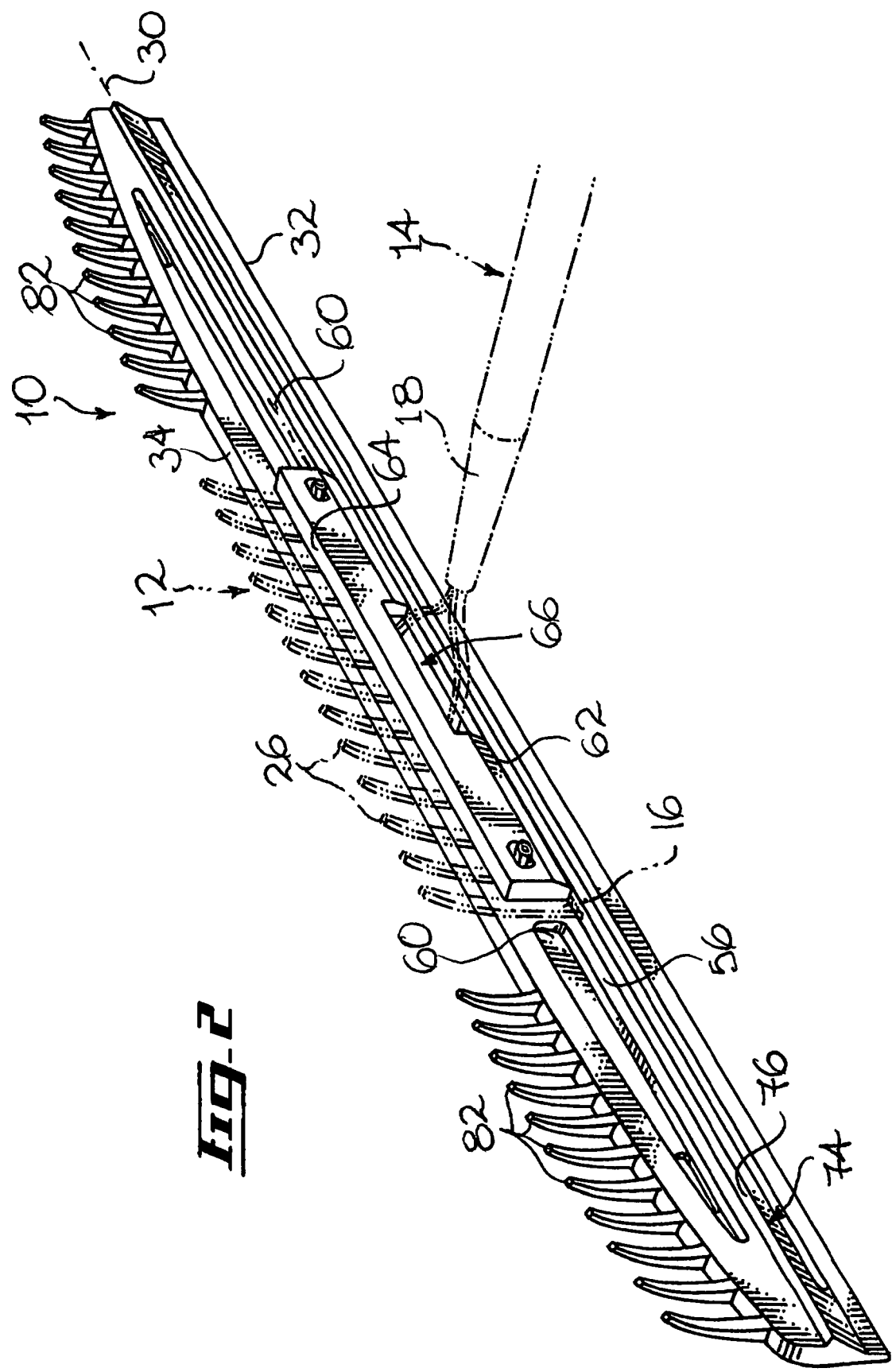
FIG. 2, in a partial perspective view with sections taken out, illustrates a scraping adapter in accordance with a second embodiment of the present invention, the scraping adapter being shown mounted to a raking head part of a conventional rake, the rake being partially shown and being illustrated in phantom lines.

Referring to FIG. 2, there is shown a scraping adapter in accordance an embodiment of the present invention generally indicated by the reference numeral 10. The scraping adapter is shown mounted to the raking head 12 of a conventional rake. The raking head 12 extends from an elongated rake handle 14 (only portion of which is shown). The raking head 12 includes a generally elongated head base 16 defining a head base longitudinal axis.

Figure 4:
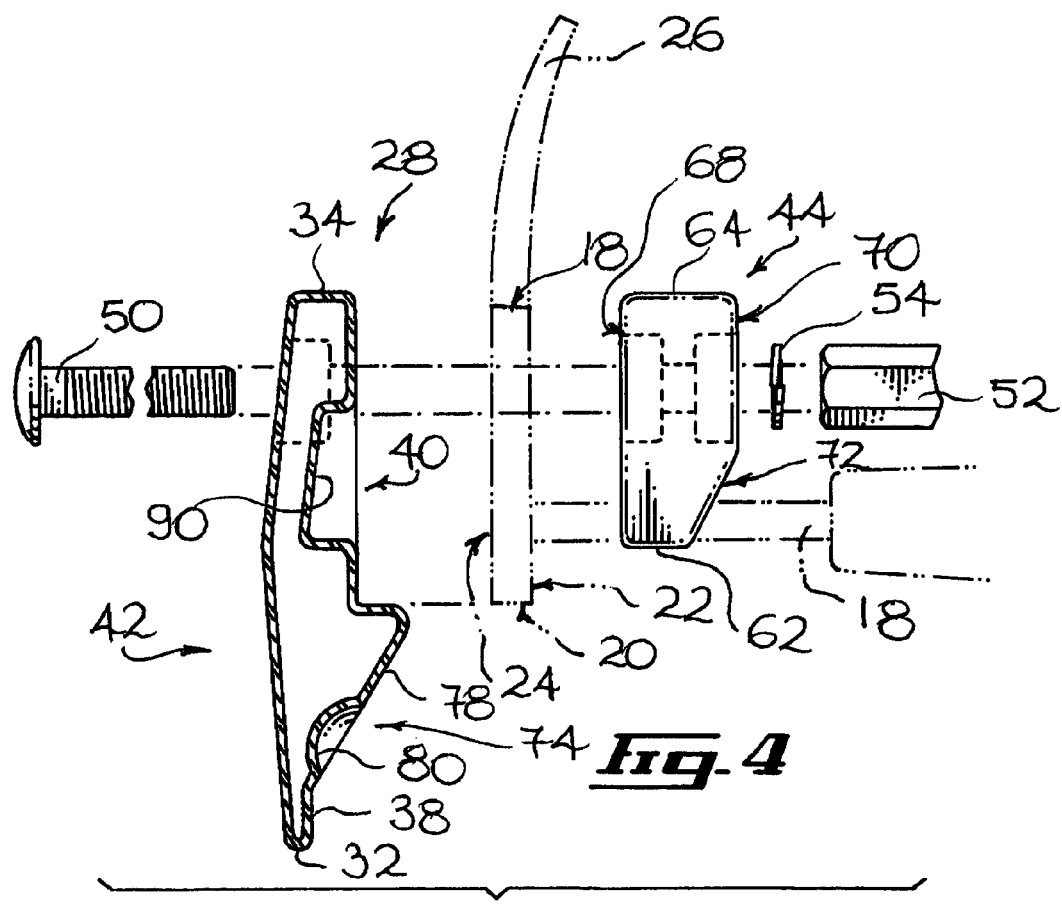
FIG. 4, in a partial transversal cross-sectional view, illustrates a scraping adapter in accordance with an embodiment of the present invention about to be mounted to a raking head.

As shown more specifically in FIG. 4, the head base 16 defines a head base first longitudinal edge 18 and a substantially opposed head base second longitudinal edge 20. The head base 16 also defines a head first side 22 facing substantially towards the rake handle 14 and an opposed head second side 24.

As illustrated more specifically in FIG. 2, the raking head 12 also includes a plurality of rake tines 26 extending outwardly from the base first longitudinal edge 18 in a substantially parallel and spaced relationship relative to each other.

Figure 1:
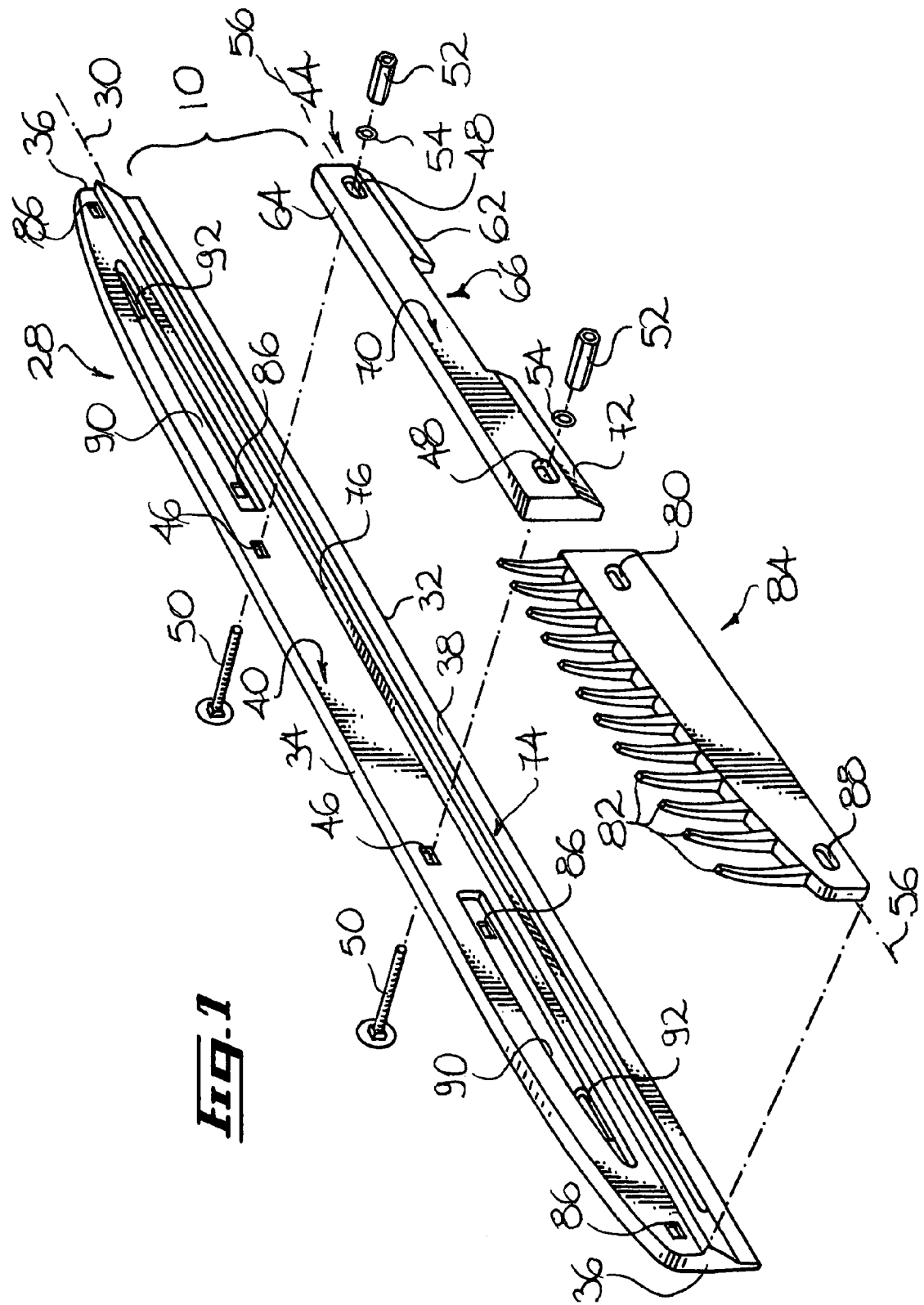
FIG. 1, in a partial exploded view with sections taken out, illustrates part of a scraping adapter in accordance with an embodiment of the present invention.

As illustrated in FIG. 1, the scraping adapter 10 includes a substantially elongated adapter body 28 defining a body longitudinal axis 30, a body first longitudinal edge 32, a substantially opposed body second longitudinal edge 34 and a pair of substantially opposed body longitudinal ends 36. The adapter body 28 is configured so as to provide a substantially longitudinally extending scraping section 38 substantially adjacent said body first longitudinal edge 32.

The scraping adapter 10 also includes a body-to-head attachment means or structure for attaching the adapter body 10 to the raking head 12 with the head base and body longitudinal axes in a substantially parallel relationship relative to each other and the scraping section 38 positioned substantially opposite the rake tines 26.

Typically, the scraping section 38 extends inwardly from the body first longitudinal edge 32 between the body longitudinal ends 36. Alternatively, the scraping section 38 could extend only partially between the body longitudinal ends 36.

As illustrated more specifically in FIG. 4, the adapter body 28 defines a body first main surface 40 and a substantially opposed body second main surface 42. The body first main surface 40 is configured and sized so that at least part of the head second surface 24 is positionable against the body first main surface 40.

Typically, the body-to-head attachment means includes an attachment plate 44. Said attachment plate 44 is configured and sized so as to be releasably positionable in an attachment configuration over at least a portion of the head first side 22.

The body-to-head attachment means also includes a biasing means or structure for biasing the attachment plate 44 against the head first side 22 when the head second side 24 contacts the body first main surface 40 so as to squeeze the raking head 12 between the adapter body 28 and the attachment plate 44.

As illustrated more specifically in FIG. 1, the biasing means typically includes at least one and preferably two body attachment apertures 46 extending through the adapter body 28. The biasing means also typically includes at least one and preferably two corresponding plate attachment apertures 48 extending through the attachment plate 44.

The body and plate attachment apertures 46, 48 are configured, positioned and sized so as to be substantially in register when the attachment plate 44 is in the attachment configuration. The biasing means typically further includes at least one and preferably two corresponding attachment assemblies for extending through the attachment component and plate apertures 46 and 48, and biasing the attachment plate 44 towards the adapter body 28. Typically, each attachment assembly includes a bolt 50 and a corresponding nut 52. Conventional washer rings 54 may also be used.

Typically, the attachment plate 44 has a substantially elongated configuration defining a plate longitudinal axis 56. When more than one body and plate attachment apertures 46, 48 are used, the body and plate attachment apertures 46, 48 are typically longitudinally spaced respectively along the body and plate longitudinal axes.

Figure 3:
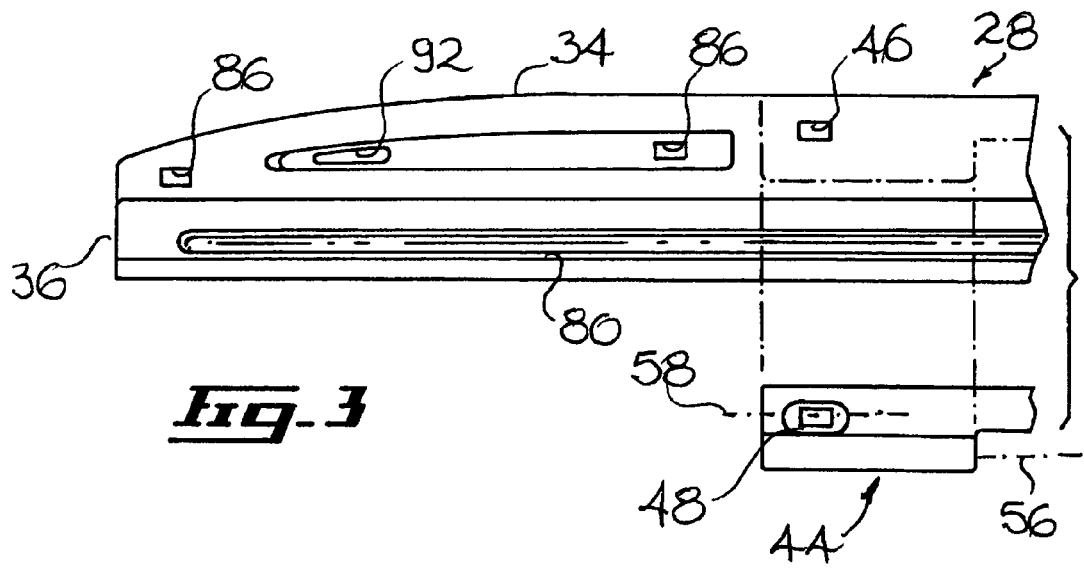
FIG. 3, in a partial elevational view with sections taken out, illustrates part of the scraping adapter shown in FIG. 1.

As shown throughout the Figures and illustrated more specifically in FIG. 3, at least one and preferably all of the plate attachment apertures 48 typically have a substantially elongated configuration so as to define an attachment aperture longitudinal axis 58. The attachment aperture longitudinal axis 58 is typically in a substantially parallel relationship relative to the plate longitudinal axis 56 so as to allow adjustment of the longitudinal positioning of the attachment assembly along the plate longitudinal axis 56.

As illustrated more specifically in FIGS. 1 and 3, the attachment plate 44 typically has a substantially elongated configuration defining a first plate longitudinal edge 62 and a substantially transversely opposed plate second longitudinal edge 64. The plate first longitudinal edge 62 is typically provided with a plate recess 66 formed therein. As illustrated more specifically in FIG. 2, the late recess 66 is configured and sized so as to receive part of the rake handle 18 when the attachment plate 44 is in the attachment configuration.

As illustrated more specifically in FIG. 4, the attachment plate 44 defines a plate first surface 68 for contacting the rake head 12 and an opposed plate second surface 70. The plate second surface 70 typically has a plate bevelled section 72 tapering inwardly towards the plate first longitudinal edge 62.

As illustrated throughout the Figures and. more specifically, in FIG. 4, the body first main surface 40 is typically provided with an abutment protrusion 74 protruding substantially outwardly therefrom. The abutment protrusion 74 defines an abutment surface 76 configured, sized and positioned for abuttingly supporting the head base second longitudinal edge 20.

Typically, the abutment surface 76 extends in a substantially perpendicular relationship relative to the body first main surface 40. Typically, the abutment protrusion 74 also includes an angled protrusion surface 78 extending at an angle between the abutment surface 76 and the body main surface 40. Typically, the abutment protrusion 74 also includes a longitudinally extending reinforcement groove 80 formed therein.

In at least some embodiments of the invention, the scraping adapter 10 further includes auxiliary tines 82 extending from the scraping adapter 10 substantially opposite the scraping section 38. Typically, the auxiliary tines 82 are positioned substantially lateral relative to the rake tines 26 on at least one and preferably both sides of the rake tines 26 when the scraping adapter 10 is attached to the rake head 12.

In the embodiment shown in FIG. 2, the auxiliary tines 82 extend from the adapter body 28 substantially adjacent the body second longitudinal edge 34. In the embodiment shown in FIG. 1, the scraping adapter 10 further includes at least one and typically two auxiliary plates 84 (only one of which is shown). The auxiliary tines 82 extend from the auxiliary plates 84. Each auxiliary plate 84 is typically releasably attachable to the adapter body 28 so as to be positioned substantially laterally relative to the raking head 12 when the raking head 12 is attached to the scraping adapter 10.

Typically, each auxiliary plate 84 releasably attachable to the adapter body 28 using an auxiliary plate-to-adapter body attachment structure or means. Typically, the auxiliary plate-to-adapter body attachment structure or means includes at least one and preferably two body auxiliary apertures 86 extending through the adapter body 28 and at least one and preferably two corresponding auxiliary apertures 88 extending through a corresponding auxiliary plate 84. The auxiliary plate-to-adapter body attachment structure or means typically further includes at least one and preferably two corresponding auxiliary attachment assemblies (not shown) for extending through both the body and plate auxiliary apertures 86, 88 and squeezing a corresponding auxiliary plate 84 against the adapter body 28.

Typically, the adapter body 28 is further provided with at least one and preferably two body reinforcement recesses 90 formed therein typically in the body first main surface 40.

Typically, the scraping adapter 10 is still further provided with at least one and typically two hooking apertures 92 extending through the adapter body 28 for allowing the latter to be hooked to a suitable support when not in use.

Typically, the adapter body 28 is made out of an integral piece of material. Typically, although by no means exclusively, the adapter body 28 is manufactured using conventional forms of manufacturing such as injection moulding out of a suitable polymeric resin. Typically, although by no means exclusively, as illustrated in FIG. 4, the adapter body 28 is generally hollow.

I claim:

1. A scraping adapter for attachment to the raking head of a rake, said raking head extending from a substantially elongated rake handle, said raking head including a generally elongated head base defining a head base longitudinal axis, a head base first longitudinal edge and a substantially opposed head base second longitudinal edge, said head base also defining a head first side facing substantially towards said rake handle and an opposed head second side; said raking head also including a plurality of rake tines extending outwardly from said head base first longitudinal edge in a substantially parallel and spaced relationship relative to each other, said scraping adapter comprising:

a substantially elongated adapter body defining a body longitudinal axis, a body first longitudinal edge, a substantially opposed body second longitudinal edge and a pair of substantially opposed body longitudinal ends;

said adapter body being configured so as to provide a substantially longitudinally extending scraping section substantially adjacent said body first longitudinal edge;

a body-to-head attachment structure for attaching said adapter body to said raking head with said head base and body longitudinal axes in a substantially parallel relationship relative to each other and said scraping section positioned substantially opposite said rake tines;

said adapter body defining a body first main surface and a substantially opposed body second main surface, said body first main surface being configured and sized so that at least part of said head second surface is positionable against said body first main surface; said body-to-head attachment structure including an attachment plate, said attachment plate being configured and sized so as to be releasably positionable in at attachment configuration over at least a portion of said head first side;

a biasing structure for biasing said attachment plate against said head first side when said head second side contacts said body first main surface so as to squeeze said raking head between said adapter body and said attachment plate.

2. A scraping adapted as recited in claim 1, wherein said biasing structure includes at least one body attachment aperture extending through said adapter body;

at least one plate attachment aperture extending through said attachment plate;

said body and plate attachment apertures being configured, sized and positioned so as to be substantially in register when said attachment plate is in said attachment configuration;

at least one attachment assembly for extending through said attachment component and plate apertures and biasing said attachment plate against said head first surface.

3. A scraping adapter as recited in claim 2, wherein said at least one attachment assembly includes a bolt and a corresponding nut.

4. A scraping adapted as recited in claim 2, wherein said attachment plate has a substantially elongated configuration defining a plate longitudinal axis; said biasing structure including a pair of body and plate attachment apertures, said body and plate attachment apertures being longitudinally spaced respectively along said body and plate longitudinal axes.

5. A scraping adapter as recited in claim 4, wherein said at least one attachment aperture has a substantially elongated configuration so as to define an attachment aperture longitudinal axis, said attachment aperture longitudinal axis being in a substantially parallel relationship with said plate longitudinal axis so as to allow adjustment of the longitudinal positioning of said attachment assembly along said plate longitudinal axis.

6. A scraping adapter as recited in claim 1, wherein said attachment plate has a substantially elongated configuration defining a first plate longitudinal edge and a substantially transversely opposed plate second longitudinal edge;
   said plate first longitudinal edge being provided with a plate recess formed therein;
   said plate recess is adapted to receive part of said rake handle when said attachment plate is in said attachment configuration.

7. A scraping adapter as recited in claim 6, wherein said attachment plate defines a plate first surface for contacting said rake head and an opposed plate second surface, said plate second surface having a plate bevelled section tapering inwardly towards said plate first longitudinal edge.

8. A scraping adapter as recited in claim 1, wherein said body first main surface is provided with an abutment protrusion protruding substantially outwardly therefrom; said abutment protrusion defining an abutment surface configured, sized and positioned for abuttingly supporting said head base second longitudinal edge.

9. A scraping adapter as recited in claim 8, wherein said abutment surface extends in a substantially perpendicular relationship relative to said body first main surface, said abutment protrusion also including an angled protrusion surface extending at an angle between said abutment surface and said body first main surface.

10. A scraping adapted as recited in claim 9, wherein said abutment protrusion has a longitudinally extending reinforcement groove formed therein.

11. A scraping adapter as recited in claim 1, wherein said scraping section extends inwardly from said body first longitudinal edge between said body longitudinal ends.

12. A scraping adapter for attachment to the raking head of a rake, said raking head extending from a substantially elongated rake handle, said raking head including a generally elongated head base defining a head base longitudinal axis, a head base first longitudinal edge and a substantially opposed head base second longitudinal edge, said head base also defining a head first side facing substantially towards said rake handle and an opposed head second side; said raking head also including a plurality of rake tines extending outwardly from said head base first longitudinal edge in a substantially parallel and spaced relationship relative to each other, said scraping adapter comprising:
   a substantially elongated adapter body defining a body longitudinal axis, a body first longitudinal edge, a substantially opposed body second longitudinal edge and a pair of substantially opposed body longitudinal ends;
   said adapter body being configured so as to provide a substantially longitudinally extending scraping section substantially adjacent said body first longitudinal edge;
   a body-to-head attachment structure for attaching said adapter body to said raking head with said head base and body longitudinal axes in a substantially parallel relationship relative to each other and said scraping section positioned substantially opposite said rake tines;
   said scraping adaptor further comprising auxiliary tines extending from said scraping adapter substantially opposite said scraping section; said auxiliary tines being positioned substantially lateral relative to said rake tines on at least one side of said rake head when said scraping adapter is attached to said rake head.

13. A scraping adapted as recited in claim 12, wherein said auxiliary tines extend from said scraping adapter on both sides of said rake head when said scraping adapter is attached to said rake head.

14. A scraping adapter as recited in claim 12, wherein said auxiliary tines extend from said adapter body substantially adjacent said body second longitudinal edge.

15. A scraping adapter as recited in claim 12, further comprising at least one auxiliary plate, said auxiliary tines extending from said at least one auxiliary plate, said at least one auxiliary plate being releasably attachable to said adapter body so as to be positioned substantially laterally relative to said raking head when said raking head is attached to said scraping adapter.

16. A scraping adapter as recited in claim 12, further comprising a pair of auxiliary plates, each of said auxiliary plates being provided with auxiliary tines extending therefrom, said auxiliary plates being releasably attachable to said adapter body so as to be positioned substantially laterally relative to said raking head on each side of the latter when said raking head is attached to said scraping adapter.

17. A scraping adapter as recited in claim 15, wherein said at least one auxiliary plate is releasably attachable to said adapter body using
   at least one body auxiliary aperture extending through said adapter body;
   at least one plate auxiliary aperture extending through said at least one auxiliary plate;
   at least one auxiliary attachment assembly for extending through both said at least one body and plate auxiliary apertures and squeezing said at least one auxiliary plate against said adapter body.

* * * * *